Sept. 13, 1966    B. EDWARDS    3,272,384
METHOD AND APPARATUS FOR SEPARATING STACKED, TELESCOPED LIDS
Filed Oct. 13, 1964    2 Sheets-Sheet 1
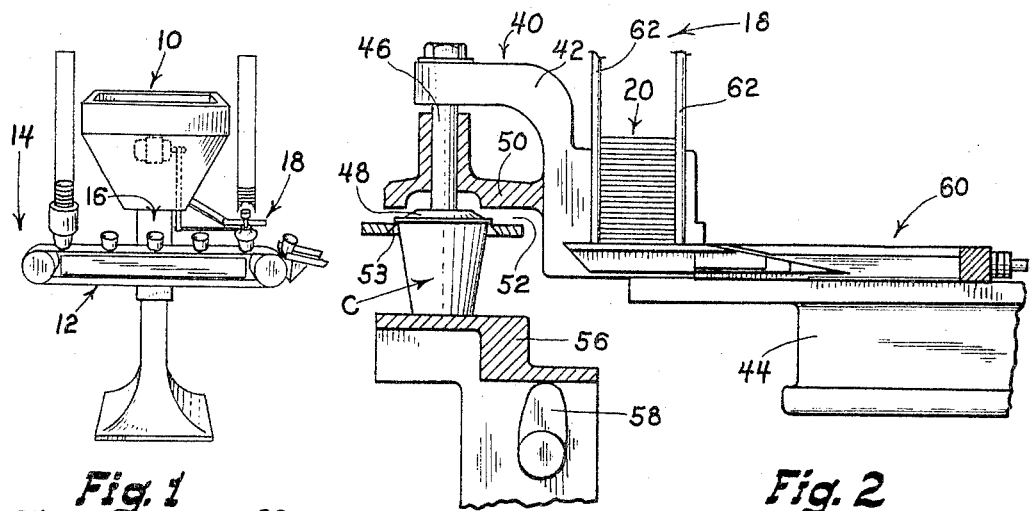
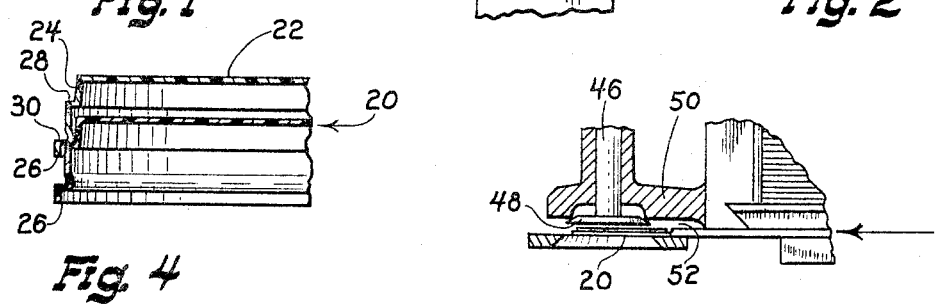
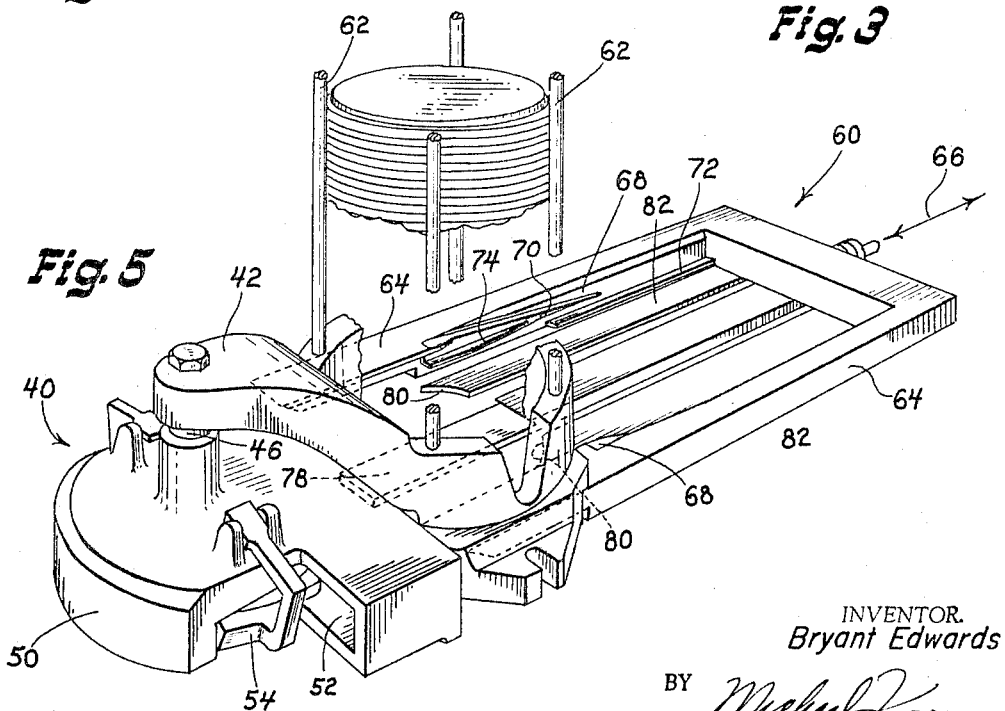
INVENTOR.
Bryant Edwards
BY Michael Kovac
His Att'ys

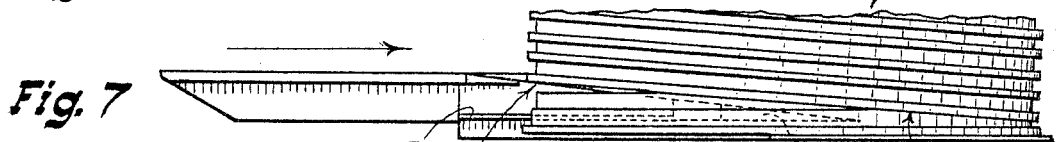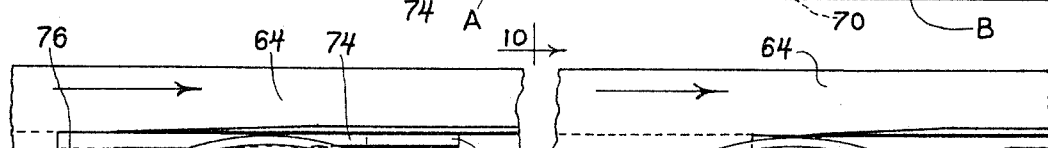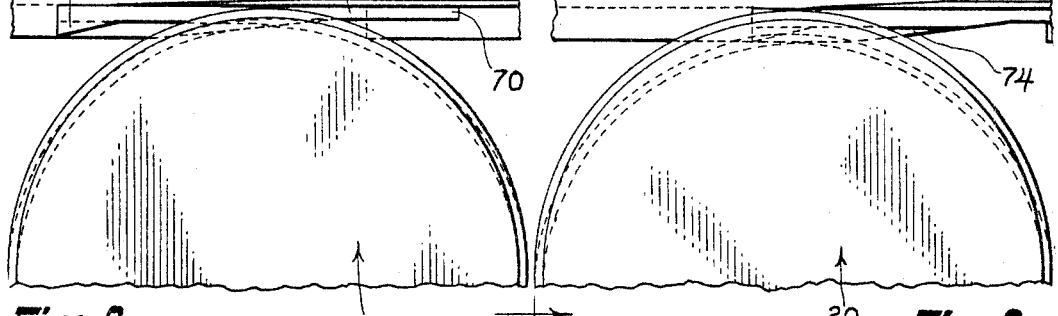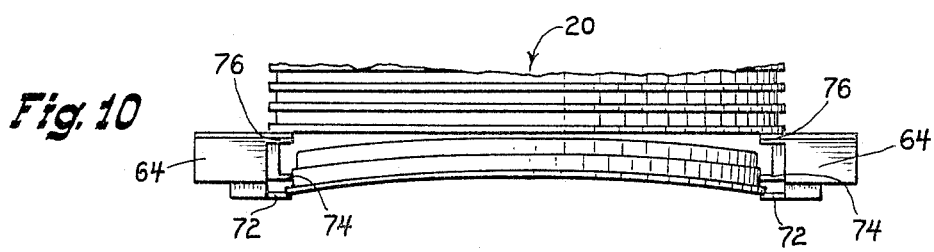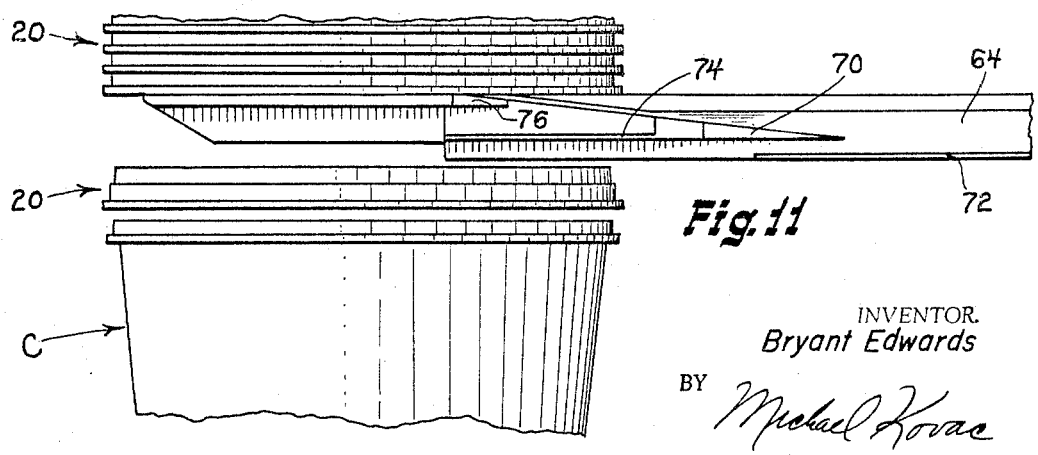
INVENTOR.
Bryant Edwards
BY Michael Kovac
His Att'ys

United States Patent Office 3,272,384
Patented Sept. 13, 1966

3,272,384
METHOD AND APPARATUS FOR SEPARATING STACKED TELESCOPED LIDS
Bryant Edwards, Clarendon Hills, Ill., assignor to Illinois Tool Works Inc., Chicago, Illinois, a corporation of Delaware
Filed Oct. 13, 1964, Ser. No. 403,583
6 Claims. (Cl. 221—1)

The present invention relates to a method and apparatus for separating individual lids or closure members from a stack of lids, and more particularly, to a method and apparatus for positively and repetitively separating lids which are stacked together in telescoped relationship for dispensing thereof.

Where lids have portions extending either upwardly or downwardly from a planar surface so as to be capable of engaging internal or external walls of a container beneath the open end thereof, problems are encountered in continuously dispensing the lids one at a time, such as in automatic container filling and capping apparatus. Lids of the above mentioned type are normally stacked in telescoped relationship so as to accommodate a maximum number of lids within as small a space as possible, but the interference between adjacent lids makes it impossible to remove the lids in a direction substantially normal to their axes. Yet, it is desirable to remove the lids in this manner in certain capping and filling machines, and other apparatus.

One of the common ways of accomplishing the removal of telescoped lids is by using the diverging ramp principle which imposes a separating force between adjacent lids. In instances where the lids have a small axial height to width ratio, this approach is ineffective in separating the lids because of their tendency to bind together when angularly offset from one another, and it will also create jam-ups in the machinery which is obviously undesirable. In my prior patent, U.S. Patent No. 3,122,267 dated Feb. 25, 1964, I disclose and claim a novel method and apparatus for removing individual lids from a stack of telescoped lids by employing an overcenter movement so that interfering surfaces of adjacent lids are removed as an obstacle in separating the lids. The approach disclosed in my aforesaid patent is particularly useful where lids are configured to provide a bottom wall surface and side walls extending upwardly therefrom since the bottom wall surface is capable of a relatively large overcenter movement as it is deflected downwardly and away from the bottom wall surface of an adjacent lid. Overcenter movement is either impossible to achieve or is drastically reduced in lids having a top surface and a side wall extending downwardly therefrom since the side wall limits the amount of flexure, whereas with lids having a bottom wall surface and side walls extending upwardly therefrom, the side walls do not restrict the amount of flexure of said bottom wall surface outside of the plane containing the side wall. The present invention, while particularly effective with lids having a top surface and a downwardly extending side wall, is also effective with other types of telescoped lids as will become apparent.

Accordingly, it is an object of the present invention to provide a method and apparatus for positive and reliable separation of individual lids from a stack of telescoped lids.

Another object of the present invention is the provision of a novel method and apparatus for assuring continuous and repetitive separation of lids, particularly flexible thermoplastic lids, from a telescoped stack of lids without binding or wedging of adjacent lids.

Still another object of the present invention is the provision of a novel method and apparatus which is capable of stripping individual lids of any shape or configuration from a stack of telescoped lids.

A still further object of the present invention is the provision of a novel shuttle mechanism for use in automatic container capping and filling apparatus and the like which efficiently and effectively separates individual lids from a stack of lids and avoids jam-ups in the shuttle mechanism.

Yet another object of the present invention is the provision of a novel shuttle mechanism for imposing various separating forces between adjacent telescoped lids in a stack of lids for effecting removal of the lids from each other without subjecting the lids to injury.

Still another object of this invention is the provision of a novel shuttle mechanism which will rapidly and effectively separate individual telescoped lids from each other in a mechanically efficacious manner, and which is otherwise well adapted for the purposes intended.

Other objects and advantages will become apparent from the following description when taken in connection with the accompanying drawings wherein:

FIG. 1 is a front elevational view of an automatic filling and capping machine with which the instant invention may be associated;

FIG. 2 is an enlarged fragmentary side elevational view, partly in section, of the filling and capping machine as viewed along the right side of FIG. 1, and particularly showing the capping station;

FIG. 3 is a fragmentary side elevational view, partly in section, of the capping station shown in FIG. 2 as a lid member is moved thereto;

FIG. 4 is a fragmentary sectional view showing a pair of lids stacked in telescoped relationship;

FIG. 5 is a fragmentary perspective view of the capping and shuttle mechanisms shown in FIG. 2;

FIG. 6 is an elevational view showing one side of the shuttle mechanism just prior to engagement with a stack of lids;

FIG. 7 is a view similar to FIG. 6 and showing the shuttle mechanism imposing a separating force between the bottommost and penultimate lids in the stack;

FIG. 8 is a partial top plan view of one side of the shuttle mechanism as it engages and bows a lid out of its plane;

FIG. 9 is a view similar to FIG. 8 and showing the lid being further deflected by the shuttle mechanism;

FIG. 10 is a fragmentary sectional view taken along line 10—10 of FIG. 9 and showing the bowed condition of the bottommost lid; and FIG. 11 is a fragmentary elevational view similar to FIGS. 6-7, but showing the bottommost lid being positioned by gravity on a supporting container without the use of the capping mechanism illustrated in FIGS. 2-3 and 5.

Referring more specifically to the drawings and first to FIG. 1, an automatic container filling and capping mechanism 10 is shown and comprises a machine frame to which an endless conveyor belt 12 is secured for transporting containers from a container dispensing station 14 to a filling station 16, and then to a capping station 18. The present invention is primarily concerned with the mechanism used to transport the lids 20 to the capping station 18 as will become apparent hereinafter.

The lids 20 are of the telescoped and stacked variety as is best shown in FIG. 4 wherein a pair of adjacent lids are nested one within the other in telescopic relationship. Each of the lids 20 is provided with a top surface 22 and a depending side wall 24 which tapers downwardly and outwardly to a lip portion 26 at its outer free extremity. The side wall 24 has stepped portions 28, 30 formed therein for stacking the lids in the following manner. The shoulder 28 of the lowermost lid in each pair of lids cooperates with the shoulder or stepped portion 30 in the lid positioned thereabove for stacking and limiting the telescopic relationship of the lids. It is to be noted that the lids 20, when aligned in stacked relationship, have the rim or lip portions 26 separated from each other by a distance known as the stacking height of the lids. This stacking height is determined by the location of the shoulders or stepped portions in the side wall of each lid, and can be moved upwardly or downwardly relative to the top surface 22 as desired. While the present invention has been particularly developed for use with lids having the configuration shown, it will be apparent from the discussion that follows that telescoped lids of any dimension and configuration will be effectively separated from each other without binding between adjacent lids.

The capping station 18 as best shown in FIGS. 2–3 and 5 comprises a capping mechanism 40 for receiving and securing individual lids to an associated container, the lids 20 being dispensed one at a time by the shuttle mechanism 60 of the capping station. The capping mechanism 40 is provided with a bracket arm 42 which is secured to the frame 44 of the machine and supports a rod 46 at one end thereof. A disc 48 is secured to the outer free extremity of the rod 46 and is adapted to force a lid 20 over the open upper end of an associated container designated by letter C. Housing 50 surrounds the rod 46 and is slidable vertically thereon from its uppermost position as illustrated in FIG. 2 to its lowermost position as shown in FIG. 3. An opening 52 is provided in the housing for receiving the lids 20 as best seen in FIG. 3, and the yielding pivotal fingers 54, which are secured to the upper surface of the housing 50, act to engage and hold the lids 20 until engaged by the capping disc 48. The lids 20 are positioned into the opening 52 of the housing 50 when in its lowermost position as seen in FIG. 3. When a lid is positioned beneath the disc 48 and held in place by the spring urged pivotal fingers 54, a shelf or platform 56 positioned beneath the conveyor belt 12 in the vicinity of the capping station is forced upwardly by cam member 58 in timed relation to the positioning of a cup C beneath the capping mechanism, and thereby positions the cup within the downwardly facing open mouth of the housing 50. The rim of the container will engage the tapered mouth area 53 surrounding this open mouth and the housing 50 will rise with the container. The lid positioned in housing 50 is prevented from rising by the disc 48 which engages the top surface thereof and forces it over the open upper end of the container.

The above described capping mechanism 40 is merely exemplary of various devices that can be used to receive a lid dispensed from the shuttle mechanism 60 and cam it over the open upper end of a filled container. It is also to be understood that the shuttle mechanism 60, which is to be presently described, can be used alone in dispensing the lids 20 as illustrated in FIG. 11, or with any other apparatus as desired.

A stack of lids 20 is confined between four upright rods 62 which are fixed to the annular portion of the bracket arm 42. The rods 62 hold the lids 20 in a substantially vertical position for gravitational feeding thereof. The lids 20 rest upon the spaced legs 64 of the essentially U-shaped frame of the shuttle mechanism 60 when the shuttle is in the position shown in FIGS. 2 and 5 of the drawings. As the shuttle is moved forward from the position shown in FIG. 5 by a suitable actuator here shown as the arrow 66, the lip portion 26 of the bottommost lid rides down the upper surface 68 of the wedge means 70 provided on each of the leg members 64, and is subsequently transferred during the movement of the shuttle 60 to the supporting surface 72. When this occurs, the entire stack will rest upon supporting surface 72 in substantially vertically aligned positions, and the shuttle will be approaching its most rearward location away from the capping mechanism.

The shuttle 60 now reverses its direction and the wedge or cam means 70 imposes a progressively increasing separating force between the bottommost and the penultimate or next adjacent lid in the stack so as to provide an initial separating force between these two lids. This is readily depicted in FIGS. 6–7 wherein the wedge means 70 is shown just prior to engagement with the bottommost and penultimate lids, and after it has begun to impose its separating force. When the bottommost and penultimate lids are separated by the wedge means 70, the bottommost lid will assume a predetermined attitude different than the penultimate lid as well as the remainder of lids of the stack so that portions of the bottommost and penultimate lids are spaced from one another as depicted at "A" in FIG. 7 while other portions are in increased telescopic engagement as at "B." One of the difficulties in using this separating force is the fact that the lids which are being separated, will tend to bind together as shown, and unless there are features which will compensate for this, jam-ups in the shuttle mechanism will occur.

To compensate for this difference in attitude between the bottommost and penultimate lids in the stack and thereby minimize the effect of a binding action, converging cam rails 74 are provided on each of the leg members 64 of the shuttle and are spaced downstream of the wedge means 70. These cam rails act to deflect portions of the bottommost lid away from the penultimate lid to permit the entry of a lid stripping means 76, which is also in the form of a wedge means, and provide positive separation of the lids. FIGS. 8 and 10 depict the bowing or deflection of the bottommost lid as its side wall 24 is engaged by the converging cam rails 74. It is to be specifically noted that the cam rails 74 not only minimize the binding effect between adjacent lids, but also act somewhat as a separating force in that they squeeze the bottommost lid out of round as shown by the phantom lines in FIGS. 8–9.

When portions of the top surface 22 of the bottommost lid are deflected from the lip portion and side wall of the penultimate lid by a sufficient amount, the lid stripping means 76 will enter the spaces between the bottommost and penultimate lids so as to positively strip the bottommost lid from the remainder of the stack. The bottommost lid will thereupon drop upon the fixed tongue 78 of the shuttle mechanism for transfer to the capping mechanism 40 by the surfaces 80 at the free end of the lid supporting strips or slats 82. Alternatively, the bottommost lid 20 may be dropped directly upon an associated container "C" as shown in FIG. 11 for subsequent transfer to a suitable capping mechanism. In this manner, the lids 20 may be effectively and efficiently dispensed one at a time by the shuttle mechanism 60, which operates in timed relation to the movement of the filled containers past the capping station, to provide continuous and repetitive lid dispensing, without binding, of the lids.

While the above discussion has centered around a stack of lids superimposed upon and in vertical alignment with each other, it will be apparent that the lids may be stacked so that the top surfaces 22 thereof are inclined or are positioned in vertical rather than horizontal planes as shown in the various figures of the drawings. It will also be apparent that the shuttle mechanism may be used to separate the uppermost lid from the stack by suitable modifications. Thus, the shuttle mechanism can strip the outermost lid from the stack, whether this be the uppermost or bottommost lid.

From the foregoing, it will now be appreciated that the present invention discloses a novel method and apparatus for separating individual lids from a stack of lids in a fast, repetitive and trouble free manner. Binding engagement with telescoped lids is also avoided by the present invention, thus reducing the possibility of jam-ups in the shuttle mechanism and injury to the lids.

Although a specific embodiment of the invention has been shown and described, it is with full awareness that many modifications thereof are possible. The invention, therefore, is not to be restricted except insofar as is necessitated by the prior art and by the spirit of the appended claims.

I claim:

1. Apparatus for separating the bottommost lid from the penultimate lid in a vertical stack of telescoped flexible lids each having a top surface, and a downwardly extending side wall provided with stepped portions for stacking interference with juxtaposed lids and terminating in a lip portion, the lip portions of adjacent lids being spaced from one another by the stack height of said lids, comprising magazine means for supporting the stack of telescoped flexible lids and having an open end through which said lids are dispensed, and a reciprocating shuttle means mounted for movement relative to the open end of said magazine means to separate individual lids from said stack of lids, said reciprocating shuttle means being movable from a retracted to a dispensing position and including means for supporting said stack of lids during part of the movement from its retracted to its dispensing position, means for imposing a progressively increasing separating force between the bottommost and penultimate lids during the movement of said shuttle means to its dispensing position and while said stack of lids is held by said supporting means to initially separate at least portions of the bottommost and penultimate lids from each other, means for engaging and moving generally diametrically opposed portions of the bottommost lid toward each other during the application of the progressively increasing separating force until the generally diametrically opposed portions of the bottommost lid are spaced from the penultimate lid, and means for entering the spaces established between the bottommost and penultimate lids as said shuttle means approaches the dispensing position to engage the penultimate lid beneath its lip portion for supporting said stack of lids and to enable movement of the bottommost lid away from said stack of lids, the supporting means of said shuttle means terminating short of said last mentioned means to enable the bottommost lid to be positively stripped from the stack of lids as the shuttle means reaches its dispensing position.

2. The apparatus as defined in claim 1 wherein said supporting means comprises a pair of spaced and opposed supporting surfaces on opposite sides of the shuttle means and extending in the direction of movement thereof.

3. The apparatus as defined in claim 1 wherein the means for imposing a progressively increasing separating force comprises a pair of spaced and generally opposed wedge means positioned on the shuttle means to engage the lip portion of the penultimate lid at generally opposite diametrical portions thereof and for imposing the separating force between the bottommost and penultimate lids in the stack during the movement of the shuttle means.

4. The apparatus as defined in claim 1 wherein said means for engaging and moving generally diametrically opposed portions of the bottommost lid comprises a pair of spaced cam rails formed on said shuttle means and extending generally in the direction of movement thereof, said cam rails converging toward each other from the retracted to the dispensing position for engaging the generally diametrically opposed portions of the bottommost lid to cause said bottommost lid to be squeezed out of round to provide the spaces between the bottommost and penultimate lids.

5. The apparatus as defined in claim 4 wherein the means for entering the spaces established between the bottommost and penultimate lids comprises a pair of spaced and generally opposed wedge means positioned adjacent said cam rails for supporting the stack while separating the bottommost lid therefrom as aforementioned.

6. The method of separating the bottommost lid from the penultimate lid in a vertical stack of telescoped flexible lids each having a top surface, and a downwardly extending side wall provided with stepped portions for stacking interference with juxtaposed lids and terminating in a lip portion, the lip portions of adjacent lids being spaced from one another by the stack height of said lids, comprising the steps of supporting the stack of telescoped flexible lids with the axes thereof in alignment with each other, imposing a progressively increasing separating force between the bottommost and penultimate lids to initially separate at least portions of the bottommost and penultimate lids from each other, engaging and moving generally diametrically opposed portions of the bottommost lid toward each other during the application of the progressively increasing separating force until the generally diametrically opposed portions of the bottommost lid are spaced from the penultimate lid, and inserting a separating force within the spaces established between the bottommost and penultimate lids to engage the penultimate lid beneath its lip portion for separating said stack of lids and to enable movement of the bottommost lid away from said stack of lids.

References Cited by the Examiner

UNITED STATES PATENTS

| 1,134,651 | 4/1915 | Tramell. | |
| 1,229,733 | 6/1917 | Errett | 221—36 |
| 2,533,437 | 12/1950 | Dennis et al. | 221—221 X |
| 2,734,657 | 2/1956 | Drese | 221—278 X |
| 3,077,287 | 2/1963 | White | 221—210 |
| 3,091,362 | 5/1963 | Robinson | 221—36 |
| 3,122,267 | 2/1964 | Edwards | 221—1 |

ROBERT B. REEVES, *Primary Examiner.*

KENNETH N. LEIMER, *Examiner.*